March 30, 1954   G. A. JORGENSON   2,673,672
DOUGH PANNER

Filed Nov. 15, 1951   3 Sheets-Sheet 1

INVENTOR.
Gerald A. Jorgenson
BY
Otto Moeller
Attorney

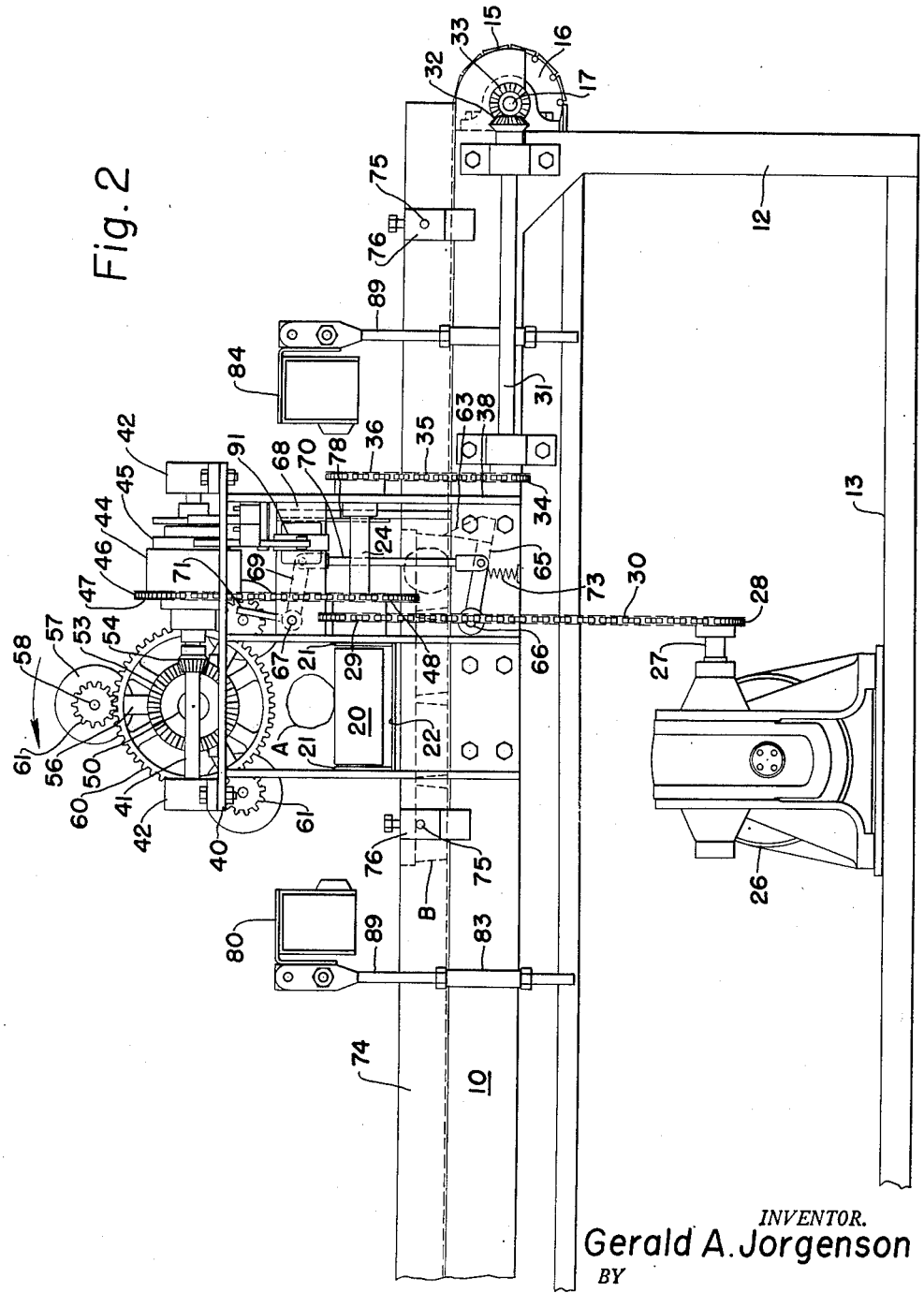

March 30, 1954
G. A. JORGENSON
2,673,672
DOUGH PANNER
Filed Nov. 15, 1951
3 Sheets-Sheet 3
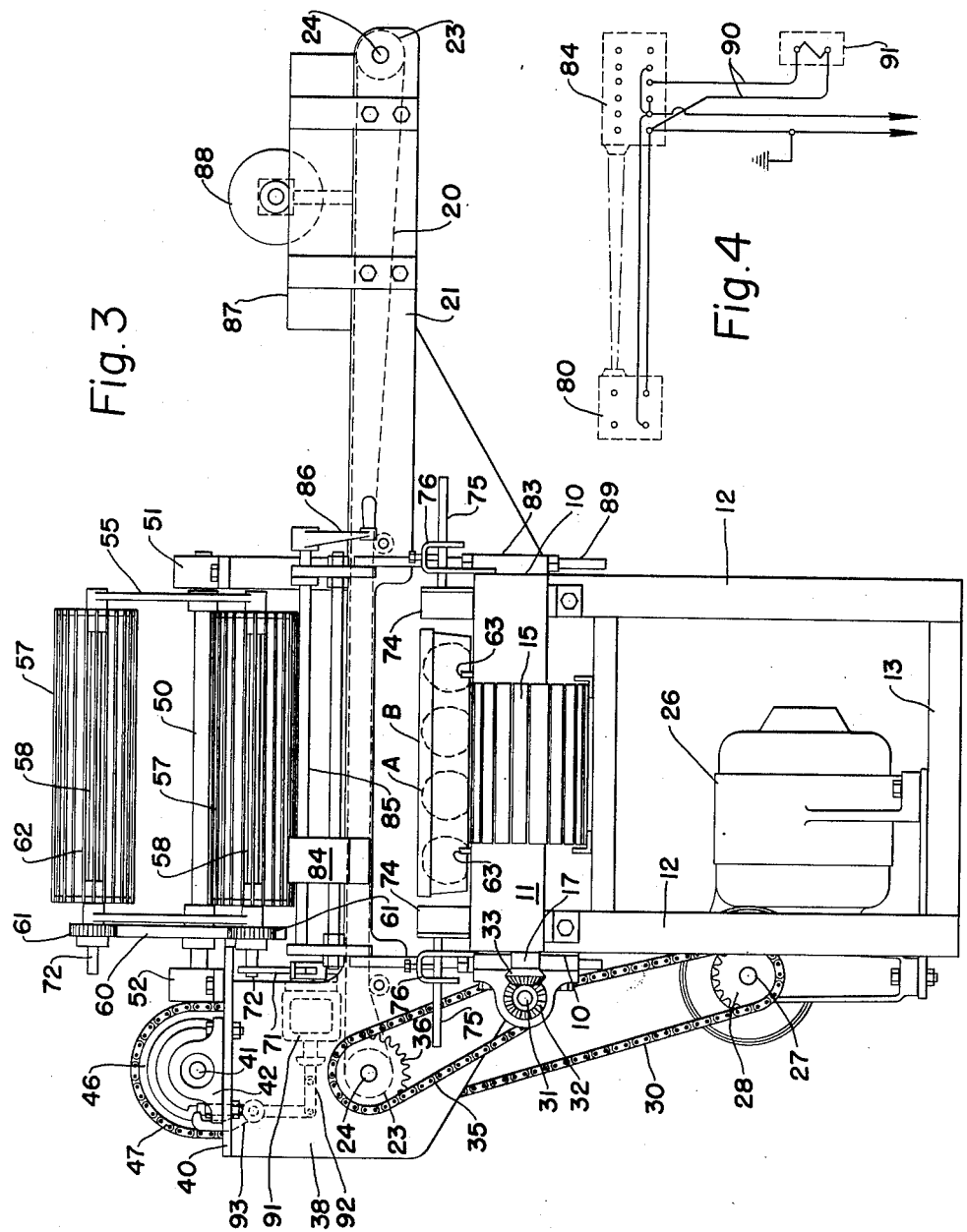
INVENTOR.
Gerald A. Jorgenson
BY
Otto Moeller
Attorney Patented Mar. 30, 1954

2,673,672

UNITED STATES PATENT OFFICE 2,673,672

DOUGH PANNER

Gerald A. Jorgenson, York, Pa., assignor to Read Standard Corporation, New York, N. Y., a corporation of Delaware Application November 15, 1951, Serial No. 256,424

7 Claims. (Cl. 226—2)

This invention relates to an improvement in bread or bun panners, and more particularly to the type wherein the desired number of dough balls are delivered to each bread pan as the bread pans are brought to the delivery station.

The invention consists in providing two conveyors, preferably traveling at right angles to each other, wherein one conveyor conducts the dough balls to a delivery station and the other conveyor carries the bread pans beneath the delivery station, whereupon the dough balls are ejected from one conveyor into the bread pans of the other conveyor, while the conveyors are in motion.

The invention further provides suitable means for synchronizing the movement of the dough balls and pans on their respective conveyors so that the dough balls may be ejected into the pans as a pan reaches its station for receiving the dough balls.

The invention consists of suitable means for initiating the operation of the dough ball ejecting means upon a dough ball entering a light beam and interrupting the conductivity of the light rays on a sensitive cell.

The invention consists of certain other novel features of construction and combinations of parts which will be hereinafter described and pointed out in the claims.

In the accompanying drawings:

Figure 2 is a view in side elevation with a portion of the pan conveyor broken away;

Figure 3 is an end view in elevation;

Figure 4 is a diagram of an electric circuit illustrating a circuit that may be employed in causing the parts to operate in timed relation.

Figure 1:
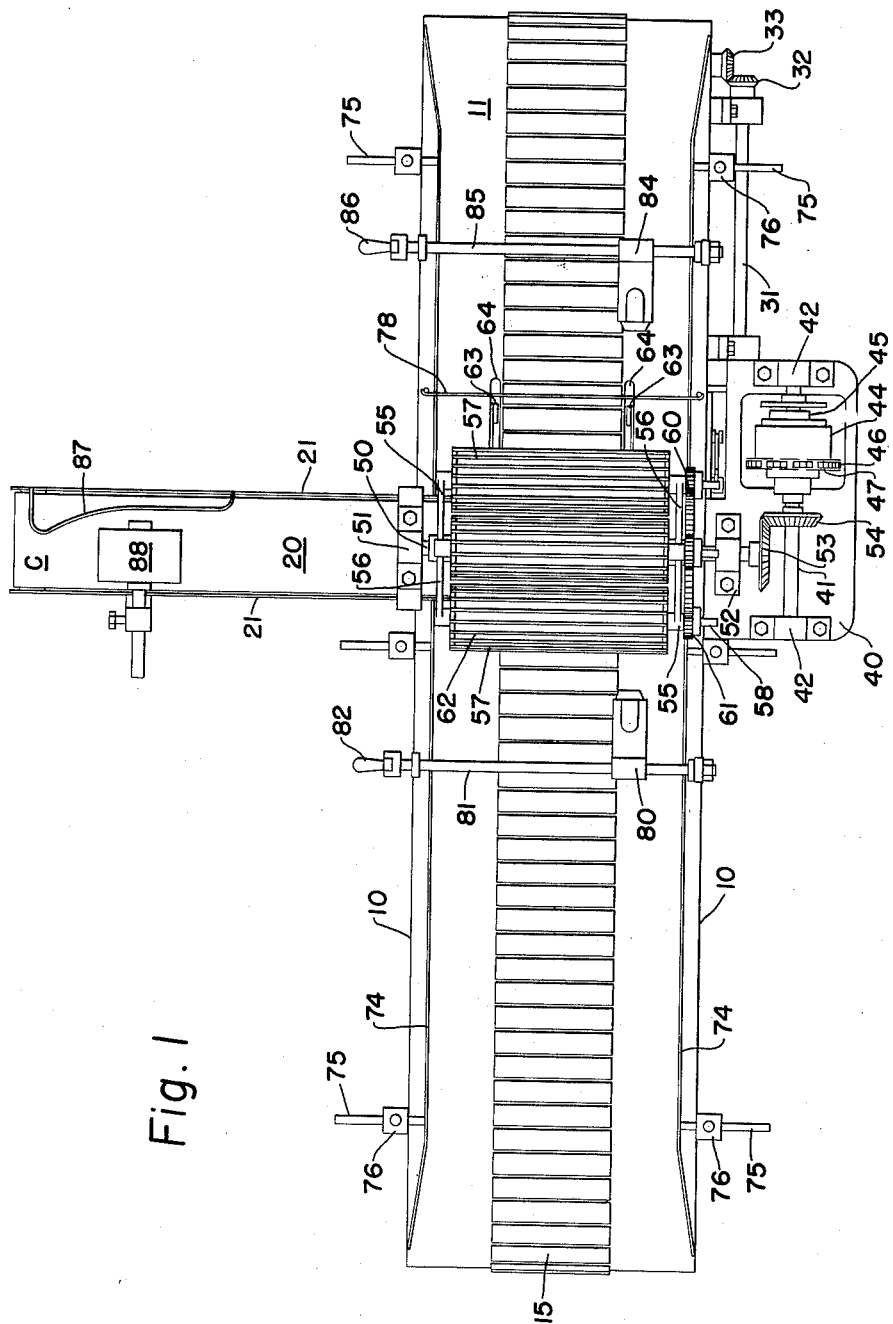
Figure 1 is a top plan view of the invention.

The machine consists of a main frame having sides 10—10, a bottom or floor 11, standards 12—12 for supporting the same, and a base 13 carried by the standards 12. A conventional endless metal slatted conveyor belt 15 extends lengthwise of the frame and passes over sprocket wheels 16 mounted on shafts 17 at the ends of the frame, see Figures 1 and 2. The floor 11 is preferably made in two longitudinal sections to provide a space therebetween for the belt 15, and thereby permitting the top of the belt to lie substantially in the same plane as the floor.

Mounted above the conveyor belt 15 and extending at right angles thereto is another and similar slatted conveyor belt 20, which is mounted in a second frame having sides 21—21 and a bottom 22. The endless belt 20 traveling over sprocket wheels 23 mounted on shafts 24 journaled in the sides 21 at the ends thereof. The second frame and its conveyor belt 20 has the ends thereof projecting beyond both sides 10 of the main frame.

A motor 26 is mounted on the base 13 of the main frame and the shaft 27 thereof is provided with a sprocket wheel 28. A sprocket wheel 29 is mounted on a shaft 24 of the belt 20 and a chain 30 is mounted over sprockets 28 and 29 for transmitting power to belt 20 to cause its travel through the second frame. A jack shaft 31 is mounted along one of the sides 10 and has a bevel gear 32 on one end thereof which meshes with a bevel gear 33 on shaft 17 of the belt 15. The opposite end of shaft 31 is provided with a sprocket wheel 34 over which a chain 35 is entrained, and which passes over a sprocket wheel 36 on shaft 24 for delivering power to shaft 17 of belt 15.

A plate or panel 38 is mounted on one of the sides of the main frame and is arranged in spaced parallel relation to the sides 21 of the second or transverse frame. This panel 38 forms a support for an end of shaft 24, see Figure 2. Mounted on the upper ends or edges of the sides 21 and panel 38 is a platform 40, having thereon a power shaft 41 journaled in bearings 42 supported by the platform. Mounted on power shaft 41 is a conventional one revolution clutch, one portion 44 of the clutch having free rotation on shaft 41 while the other portion 45 is keyed or splined to shaft 41. Clutch portion 44 is provided with a sprocket wheel 46 over which is entrained a chain 47. This chain 47 passes over a sprocket wheel 48 on shaft 24, so that when both clutch portions or members 44 and 45 are together power is transmitted to shaft 41 from shaft 24.

A reel shaft 50 is disposed above the conveyor 20 and extends in parallel relation thereto and is supported at one end in a bearing 51 mounted on the sides 21, and at its opposite end in a bearing 52 mounted on the platform 40. Mounted on the shaft 50 is a bevel gear 53 which meshes with a pinion gear 54 on shaft 41 so that shaft 50 will be rotated on power being transmitted to shaft 41 through the clutch. Spiders 55 are mounted on the shaft 50 and each is provided with three radial arms 56. Disposed between the arms 56 of the two spiders are drums or cylinders 57, mounted on shafts 58 journaled in the arms. The shafts 58 project beyond the arms 56 toward the bearing 52. Mounted to rotate with the shaft 50 is a large gear wheel 60, and each shaft 58 is provided with a pinion 61 having meshing engagement with the gear wheel 60, to impart a high rotating speed to the cylinders 57, as shaft 50 and gear 60 are rotated. It will be appreciated that the cylinders 57 are rotated with respect to the shaft 50 and arms 56, and also will revolve as a part of the reel shaft 50 and arms 56. The peripheral surface of the cylinders 57 are preferably composed of parallel bars or rods 62.

The cylinders 57 extend axially of the second frame and belt 20 and are disposed above the belt so that as the reel carrying the cylinders is rotated, a cylinder will engage a row of dough balls traveling along the belt to be discharged or ejected therefrom transversely of the belt. The cylinders are located above the belt 15 and main frame and so positioned with respect thereto that as a cylinder 57 ejects dough balls A from conveyor belt 20, the dough balls will be received in bread pans B, traveling on belt 15 in a direction at right angles to the travel of the belt 20.

To insure that the pans B will be in a position along one of the sides 21 of the second frame and therebeneath, and held, until the dough balls on belt 20 can be ejected therefrom and drop into the pans, stops or fingers 63—63 are projected through slots 64 in the floor or bottom 11 of the main frame. The stops 63 are secured to arms 65 which are secured to a rotary rod 66 extending transversely of and beneath the upper flight of the belt 15 and supported by the sides 10. A bell-crank lever is pivoted at 67 to a plate 68 secured to one of the sides 21 and panel 38, and one arm 69 of the bell-crank lever is connected to one of the stop arms 65 by a link 70, which is pivotally connected to each arm 65 and 69. The other arm 71 of the bell-crank lever projects upwardly and vertically into the path of travel of the projecting ends 72 of the cylinder shafts 58. A spring 73 has engagement with at least one of the stop arms 65 to cause the stops 63 to be projected upwardly through the slots 64 into the path of the pans B, and also to present the bell-crank arm 71 in the path of the projecting ends 72 of the shafts 58. Guides 74 are located along each of the sides 10, and between the sides and belt 15. Rods 75 are connected to the sides and are supported adjustably in brackets 76 connected to the sides 10, so that the guides may be positioned with respect to the edges of the belt 15, to maintain the pans B in proper alinement as they pass through the frame on the belt 15.

Located between the sides 10 and supported on floor 11 is a screen or baffle 78, which is disposed in front of the reel carrying cylinders 57 a sufficient distance to engage the dough balls A as they are projected from the conveyor belt 20 by the cylinders 57. The dough balls on contacting the screen or baffle 78 will fall vertically into the pan B, held by the stops 63.

An electric light 80 is secured to the sides 10 on a transverse rod 81, which is rotatable by a handle 82. The light 80 is supported at an elevation above belt 15 for directing a light ray or beam across the top of the transverse belt 20, and is disposed along one side of the main frame and the belt 15 and in rear of the reel cylinders 57. A target such as an electric eye or light sensitive cell 84 is supported on the sides 10 by a rod 85, which rod is capable of rotation by a handle 86. The target 84, or electric eye, is located in advance of the reel cylinders 57 and toward the discharge end of the belt 15. The belt 15 travels in a direction from the light 80 toward the target 84. The target 84 and light 80 are in alinement and on the same side of the main frame, and are adjustable with respect to each other, so that the light beam is directed to the target 84.

The transverse rods 81 and 85 are adjustably supported vertically by posts 89 mounted in sleeves 83 on the sides 10. The light 80 and sensitive cell 84 may be adjusted vertically by the posts 89, and horizontally on the rods 81 and 85. The baffle 78 is positioned between the light 80 and target 84 and since it is formed of wire mesh it does not interfere with the light beam passing therethrough.

The dough balls A are projected onto the delivery end C, of the transverse conveyor 20, by a roll divider, not shown, and against a curved backing plate 87 located along one of the sides 21. A roller 88 is located adjacent the plate 87 and is supported at an elevation above the belt 20, so that the dough balls will engage and rotate the roller and thereby retard or restrain the inertia of the balls as they are delivered to the conveyor 20. The conveyor 20 conducts the dough balls toward the conveyor 15 and beneath the reel cylinders 57, and in this instance, when four balls of dough are located beneath the reel cylinders 57, the first dough ball to be delivered will have been moved to the far side of the reel cylinders where it will be in the path of the light ray or beam from the light source 80 to the target 84. The passing of the dough ball into the light beam will interrupt the conductivity of the light rays to the sensitive cell or target 84. An electric circuit and relay 90 including a solenoid or magnet 91 are associated with the target, and on the interruption of conductivity of the light ray to the target the solenoid will become energized. The energizing of the solenoid will cause the link 92 connected to the solenoid 91 to operate a dog or pawl 93 connected thereto, and withdraw the pawl 93 from engagement with the clutch member 45, and allow the clutch members 44 and 45, of the single revolution clutch, to become engaged and shaft 41 to be rotated. The rotation of shaft 41 will transmit motion to bevel gear 53 through pinion 54 and shaft 50 of the reel. Gear 60 and pinions 61 will now be rotated and cause the cylinders 57 and reel to rotate. This gearing is such that on a single revolution of the clutch 44—45, the reel will be rotated substantially 120 degrees, or a third of a circle, thereby causing a single cylinder 57 to travel across the conveyor belt 20, to discharge the row of dough balls on the belt 20 to the pan B located on the belt 15, and which pan is being held by the stops 63. The movement of the cylinder 57 across the belt 20 will bring the projecting end 72 of the shaft 58 in contact with the lever arm 71 and cause the arm 71 to be oscillated. The oscillation of the arm 71 will, through the link 70 and arms 65, cause the stops 63 to be retracted through the floor 11, and the filled pan to be conveyed away by the belt 15. On the disengagement of the lever arm 71 from the shaft 58, the spring 73 will instantly cause the stops 63 to be projected into the path of the next adjacent pan and halt its movement until the cycle is again repeated.

The two conveyor belts 15 and 20 are being continuously driven by the motor 26, and the reel and its cylinders 57 are interrupted in their movement on each revolution of the clutch. Upon the ejection of the dough balls from belt 20 to the pan on belt 15, by the cylinder 57, the light beam would be again established with the target 84, and the dog 93 to again engage clutch member 45. The dough balls are supplied to the conveyor 20 in a series of four for a pan, which can be increased or diminished in accord with the size of the dough balls and pans, and if the number is four, the groups of four would be spaced to allow for the interval of operation of the reel and its cylinders.

To briefly summarize the operation, it will be noted that the light source 80 and the light sensitive cell or target 84 are alined and arranged on opposite sides of the conveyor 20, and so disposed with respect to each other that the conductivity of the light rays to the cell will be interrupted only when a ball of dough is fed between them and into the beam of light by the belt 20. When there is an interruption of conductivity to the cell 84 from the light 80, then the relay 90 and solenoid 91 associated therewith are caused to function, and the solenoid is energized causing the pawl 93 to be retracted from the one-revolution clutch 44, and power is supplied to the reel or ejector 57 to cause it to be rotated to eject the dough balls from belt 20 to belt 15. Upon the removal of the dough balls from belt 20, the conductivity of light rays to the cell 84 is immediately re-established and this cuts out the relay 90. The deenergizing of the relay 90, releases the pawl 93, and allows it to re-engage the clutch 44, stopping further rotation thereof, and at the same time discontinuing further power to the shaft 41 and ejector or reel cylinders 57. It will be appreciated that the train of gearing 53, 54, 60 and 61 are so designed that the ejector reel will rotate only 120 degrees to every revolution of the clutch, and only one of the cylinders 57 will move across the belt or conveyor 20 in ejecting the dough balls from conveyor 20 to conveyor 15. In this manner, an interval is provided in the rotation and operation of the ejector reel and allows a new supply of four dough balls to be positioned in the path of a reel cylinder 57 by the conveyor 20, and to position a dough ball in the light beam between the light source 80 and sensitive cell 84.

I claim:

1. In a bread panner, the combination of a frame provided with a conveyor having bread pans supported and carried thereby, and a dough ball conveyor arranged at an angle to said pan conveyor, an ejecting means for discharging dough balls from said dough ball conveyor to the pans on said pan conveyor, stop fingers pivotally mounted on said frame and normally positioned in the path of said pans for holding a pan during the filling thereof, a lever connected to said stop fingers and normally positioned in the path of travel of said ejecting means, and means for moving said conveyors and ejecting means, said ejecting means engaging and operating in its movement said lever for retracting said stop fingers to release one of said pans.

2. In a bread panner, the combination of a frame provided with a conveyor having bread pans supported and carried thereby, and a dough ball conveyor arranged at an angle to said pan conveyor, an ejecting means for discharging dough balls from said dough ball conveyor to the pans on said pan conveyor, stop fingers pivotally mounted on said frame and normally positioned in the path of said pans for holding a pan during the filling thereof, a lever connected to said stop fingers and normally positioned in the path of travel of said ejecting means, means for moving said conveyors, and means connected with said last named means for periodically operating said ejecting means, said ejecting means engaging and operating in its movement said lever for retracting said stop fingers to release one of said pans.

3. In a bread panner, the combination with a frame having a dough ball conveyor, a reel mounted on said frame above said conveyor having equi-distant ejector cylinders mounted about the periphery thereof for removing dough balls from said conveyor, power means for moving said conveyor, a power shaft connected with said power means, gearing connecting said power shaft and reel, and a clutch on said power shaft for controlling the rotation of said reel.

4. In a bread panner, the combination of a frame provided with a conveyor having bread pans supported and carried thereby, and a dough ball conveyor arranged at an angle to said pan conveyor, an ejecting means for discharging dough balls from said dough ball conveyor to the pans on said pan conveyor, pan stop means movable between pan engaging position for holding a pan during filling thereof and pan disengaging position for releasing a filled pan for movement by said pan conveyor, means for moving said conveyors and ejecting means, and means responsive to movement of said ejecting means across said dough ball conveyor for moving said pan stop means to pan disengaging position.

5. In a bread panner, the combination of a frame provided with a conveyor having bread pans supported and carried thereby, and a dough ball conveyor arranged at an angle to said pan conveyor, an ejecting means mounted above said dough ball conveyor for rotation about an axis extending in the direction of movement of said dough ball conveyor and having similarly extending dough ball engaging means radially disposed with respect to said axis for discharging dough balls from said dough ball conveyor to the pans on said pan conveyor, pan stop means movable between pan engaging position for holding a pan during filling thereof and pan disengaging position for releasing a filled pan for movement by said pan conveyor, means for moving said conveyors and ejecting means, and means responsive to movement of said ejecting means across said dough ball conveyor for moving said pan stop means to pan disengaging position.

6. In a dough panner, a conveyor for transporting dough pieces, an ejector rotatably mounted above said conveyor for movement thereacross to discharge dough pieces therefrom, means for intermittently operating said ejector, means responsive to movement of dough pieces in the path of said ejector for initiating successive operations of said ejector, a continuously operating conveyor extending transversely of and below said dough piece conveyor for moving pans into position to receive dough pieces discharged by said ejector, pan stop means movable between pan engaging position for holding a pan during filling thereof and pan disengaging position for releasing a filled pan for movement by said pan conveyor, and means responsive to movement of said ejector across said dough piece conveyor for moving said pan stop means to pan disengaging position.

7. In a bread panner, the combination with a frame having a dough ball conveyor, a reel mounted on said frame above said conveyor having equi-distant ejector cylinders mounted about the periphery thereof for removing dough balls from said conveyor, power means for moving said conveyor, a power shaft connected with said power means, gearing connecting said power shaft and reel, a clutch on said power shaft for periodically effecting rotation of said reel, and means responsive to movement of a dough ball by said conveyor into the path of said ejector cylinders for engaging said clutch to initiate successive operations of said reel.

GERALD A. JORGENSON.

References Cited in the file of this patent

UNITED STATES PATENTS

| Number | Name | Date |
|---|---|---|
| 2,259,777 | Politsch et al. | Oct. 21, 1941 |
| 2,333,232 | Bleam et al. | Nov. 2, 1943 |
| 2,508,086 | Alvarez | May 16, 1950 |
| 2,590,823 | Rhodes | Mar. 25, 1952 |